UNITED STATES PATENT OFFICE.

SADAMASA UYENO, OF TOKYO, JAPAN.

PROCESS OF PRODUCING THE MATERIALS FOR GENERATING HYDROGEN.

1,120,768.  Specification of Letters Patent.  Patented Dec. 15, 1914.

No Drawing.  Application filed June 4, 1912. Serial No. 701,544.

*To all whom it may concern:*

Be it known that I, SADAMASA UYENO, a subject of the Emperor of Japan, residing at No. 127 Hakusan-Goten-Machi, Koishikawa-Ku, Tokyo, Japan, have invented a new and useful Process of Producing the Materials for Generating Hydrogen, of which the following is a specification.

This invention relates to the generation of hydrogen by means of an amalgam of aluminum containing zinc and tin and has for its object to provide an improved material of this description by means of which hydrogen may be easily and quickly generated from water when required.

According to this invention the improved material employed for the above purpose consists of an alloy of aluminum and zinc with a small proportion of tin subsequently amalgamated with mercury. Broadly speaking, an alloy of aluminum, zinc and tin is first produced, the surface of which is then amalgamated with mercury, the mercury being subsequently caused to penetrate throughout the entire alloy by means of heat.

The metals of the aluminum group especially aluminum have the property of decomposing water by uniting with the oxygen and thereby separating out the hydrogen and this action is considerably increased if the metal is amalgamated.

If it is attempted to amalgamate aluminum by the process usually employed for other metals, the amalgam produced on the surface will at once decompose the moisture in the surrounding atmosphere and aluminum hydroxid is formed so that the amalgam is not stable. The mercury which is liberated proceeds to amalgamate the inner layers with aluminum which oxidizes at the same time so that ultimately the whole mass of aluminum passes through the amalgamation process but no amalgam persists as the aluminum is oxidized and hydrogen liberated as fast as amalgam is formed. If moisture is excluded, to obtain an amalgam of a large quantity of aluminum and a very small quantity of mercury is very difficult because it is necessary to heat the metal to be amalgamated to a temperature near its melting point and as the melting point of aluminum is far higher than the boiling point of mercury, the mercury evaporates long before the aluminum reaches a sufficiently high temperature to be amalgamated, so that no amalgam is obtained. It is commonly acknowledged in scientific circles that it is not possible to obtain an amalgam of aluminum. In the present invention, however, I obtain a stable aluminum amalgam by adding mercury to an alloy of aluminum zinc and tin and use can be made of the remarkable property above mentioned of decomposing water to obtain quickly a large quantity of hydrogen from ordinary water, and this is the first important feature of my invention.

In order to obtain an alloy of aluminum zinc and tin which will combine with mercury below the boiling point thereof, the quantity of zinc must not be less than twice the weight of aluminum, otherwise the melting point of the alloy is raised and mercury cannot be added as it is liable to boil. On the other hand, the amount of hydrogen generated by the alloy depends very largely on the quantity of aluminum contained therein and the second important feature of my invention consists in the method I adopt for increasing the proportion of aluminum in the amalgam. I am enabled to do this by first applying mercury to the surface of an alloy of aluminum zinc and tin so as to amalgamate it and then heating the material for a certain time at a high temperature below the boiling point of mercury, by which means the mercury is caused to penetrate gradually throughout the solid alloy and finally to amalgamate the entire mass. By this means an amalgamated alloy containing a very large proportion of aluminum can be prepared.

If the weight of aluminum in the alloy is increased the production of hydrogen will be proportionately augmented, but beyond a certain limit tne disadvantage of retarding the generation is encountered.

The invention is carried out in practice as follows:—

1. An alloy of aluminum, zinc and tin is prepared in the following proportions: aluminum from 82 to 97 parts by weight, zinc from 15 to 2.5 parts by weight, tin from 3 to 0.5 parts by weight. The aluminum is first melted in a crucible and then taken out of the furnace and the zinc and tin are added at the same time and will mix, after which the mixture is cast. Since the melting points of zinc and tin are lower than that of aluminum and the quantity of these metals is comparatively small compared with the aluminum, it is not necessary to return the crucible to the furnace as these metals will melt at once in the large quantity of molten aluminum and mix thoroughly. By this means oxidation and evaporation of the metals are reduced to a minimum. The mixture is cast in the form of a flat plate and is hereinafter termed alloy "A."

2. An amalgam is obtained by slightly heating a mixture of about three parts of mercury and one part of zinc or tin by weight and is hereinafter termed alloy "B."

3. For each part of the alloy "A" a quantity of the alloy "B" is taken and applied at the upper and lower faces of a plate of the alloy "A" by rubbing with a suitable steel brush so as to form an amalgam on the surface thereof. This operation should be carried on at a comparatively high temperature but below the boiling point of mercury.

4. The plate of alloy "A" is then uniformly heated in the absence of moisture to as high a temperature as possible without boiling the mercury, the heating being continued until the alloy is perfectly amalgamated, which may be determined by breaking a part of the plate. If the amalgamation is complete the material will be very brittle, but if not, the material will be still a little tough and have a tendency to bend. Or the portion of the material broken off may be allowed to cool in the air for a few minutes when the broken part will become black almost as soon as the piece is cold. The part where the amalgamation is not complete will however remain white and not change color.

The amalgamated alloy obtained in the aforesaid manner which is used for the purpose of generating hydrogen and is hereinafter termed "hydrogen producing material" should be kept or stored in a perfectly air tight vessel.

The manner in which my improved material may be employed for generating hydrogen is simple and is as follows:—A suitable generator is filled with water, preferably hot water, and a quantity of the "hydrogen producing material" obtained in the aforesaid manner is added in the proportion of from one-fifteenth to one-twentieth of the weight of the water in the generator. In from two to four minutes the generation of the hydrogen will be complete and one gram of the "hydrogen producing material" made in the best proportions will produce about 1200 to 1300 cubic centimeters of hydrogen. This hydrogen may be used immediately or may be collected and stored for use as required.

It will be understood that the proportions of the ingredients in the "hydrogen producing material" will be varied in accordance with conditions, for example, where cheapness is the first consideration, the quantity of mercury and tin, both of which are expensive metals, will be reduced, and the quantity of zinc increased. When quickness of generation of hydrogen is important, the quantity of tin or zinc or of both of these metals will be increased and the quantity of aluminum is reduced, and where great production of hydrogen is required, the aluminum will be increased and the quantity of zinc reduced.

Having thus described my invention, what I claim is:

1. The process of preparing an amalgam containing aluminum which comprises forming an alloy of aluminum, tin and zinc, coating the surface of the alloy with mercury and heating the same.

2. The process of preparing an amalgam containing aluminum which comprises forming an alloy of aluminum, tin and zinc, rubbing the surface of the alloy with an amalgam and heating the same.

3. The process of preparing an amalgam containing aluminum, which comprises forming an alloy of aluminum, tin and zinc, rubbing the surface of the alloy with an amalgam of mercury and zinc, and heating the same.

4. The process of preparing an amalgam containing aluminum, zinc and tin, which comprises forming an alloy of said metals, applying an amalgam to the surfaces thereof, and then heating the same to a high temperature below the boiling point of mercury.

5. The process of preparing an amalgam containing aluminum, zinc, and tin, which comprises forming an alloy of said metals, rubbing the surfaces of the alloy with an amalgam of mercury and zinc, and then heating the same to a high temperature below the boiling point of mercury.

Dated this first day of September, 1911.

SADAMASA UYENO.

Witnesses:
  GENJI KUSIBARA,
  HARUTADE YASEMRA.